Sept. 29, 1925.

O. H. GRAY

RIM

Filed Jan. 8, 1923  2 Sheets-Sheet 1

1,555,660

Otis H. Gray INVENTOR

BY Victor J. Evans
ATTORNEY

WITNESS: R. E. Wise

Sept. 29, 1925.  
O. H. GRAY  
RIM  
Filed Jan. 8, 1923  
1,555,660  
2 Sheets-Sheet 2
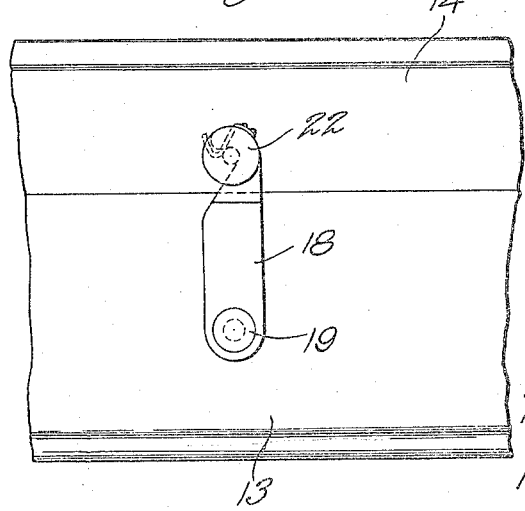
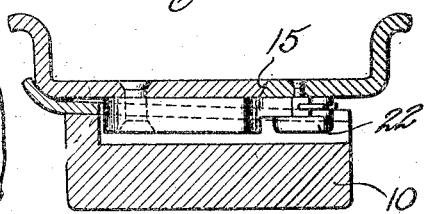
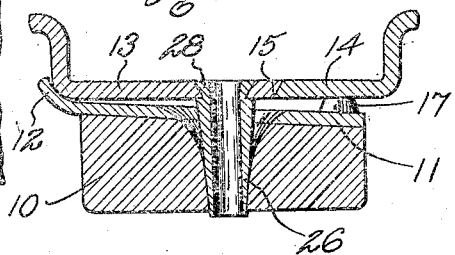
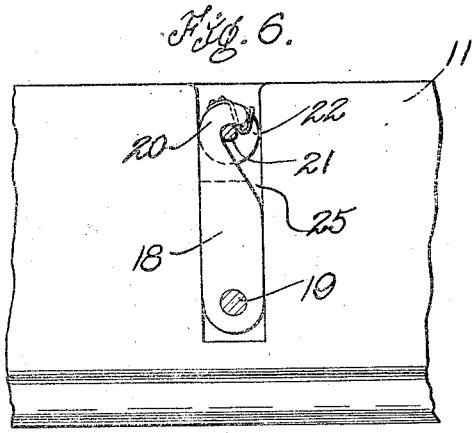
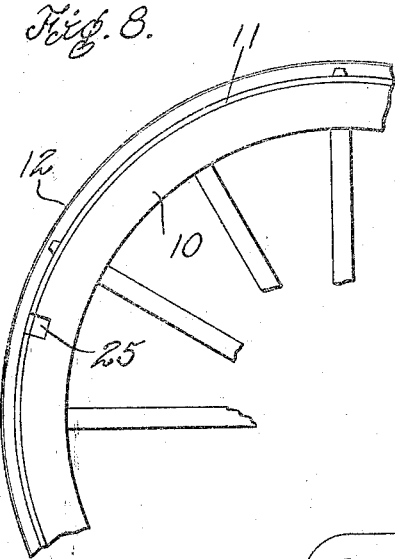
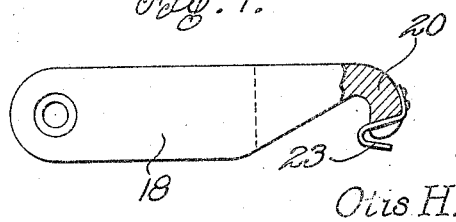
Otis H. Gray, INVENTOR Patented Sept. 29, 1925.

1,555,660

UNITED STATES PATENT OFFICE.

OTIS HUBBARD GRAY, OF ARDSLEY, NEW YORK.

RIM.

Application filed January 8, 1923. Serial No. 611,383.

*To all whom it may concern:*

Be it known that I, OTIS H. GRAY, a citizen of the United States, residing at Ardsley, in the county of Westchester and State of New York, have invented new and useful Improvements in Rims, of which the following is a specification.

This invention relates to improvements in demountable rims for vehicle wheels and has for an object to provide a rim so constructed that a tire may be placed thereon and removed therefrom with a minimum amount of labor and in a relatively short time.

Another object of the invention is the provision of a novel form of water proof joint provided between the sections of the rim, together with means for preventing relative movement of the adjacent edges of the sections, which, in addition to preventing leakage, will also prevent damage to the inner tube of the tire due to pinching or cutting the tube by the edges of the rim sections.

Another object of the invention is the provision of novel means for holding the sections together to prevent their separation before being mounted upon a wheel, the said means co-operating with means carried by the wheel to prevent the rim from creeping.

A further object of the invention is the provision of means for protecting the valve of the inner tube of a pneumatic tire, which means will also act to prevent rim creeping and insure proper positioning of the rim.

With the above and other objects in view, the invention further includes the following novel features and details of construction, to be hereinafter more fully described, illustrated in the accompanying drawings and pointed out in the appended claim.

In the drawings:—

Figure 3 is an enlarged plan view of a portion of the rim illustrating the means for securing the sections together.

Figure 4 is a transverse sectional view through the rim and felly.

Figure 5 is a similar view taken on a different plane.

Figure 6 is a fragmentary plan view of the felly band showing the manner of engagement between said band and the rim section securing means.

Figure 7 is a detail view of one of the hooks.

Figure 8 is a fragmentary elevation of a portion of a wheel with the rim and tire removed.

Figure 1:
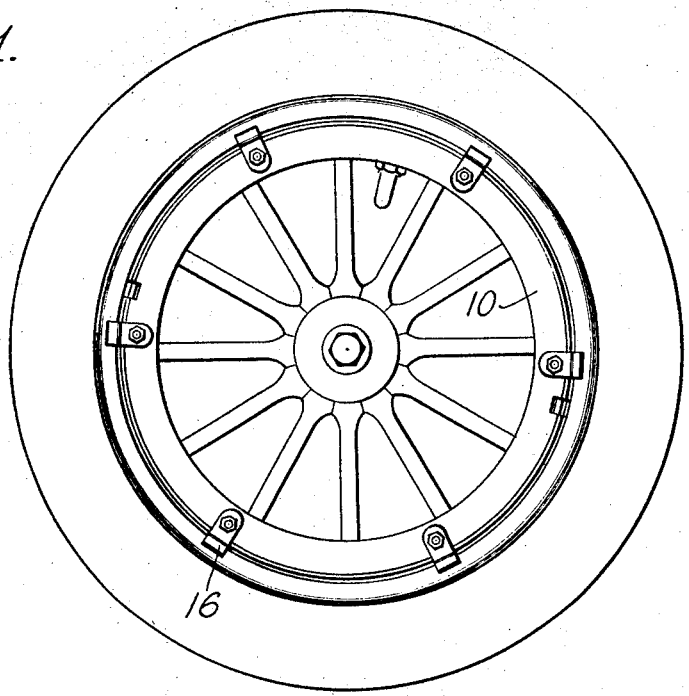
Figure 1 is a side elevation of a vehicle wheel with a tire secured thereon by means of the demountable rim which constitutes the present invention.
Figure 2:
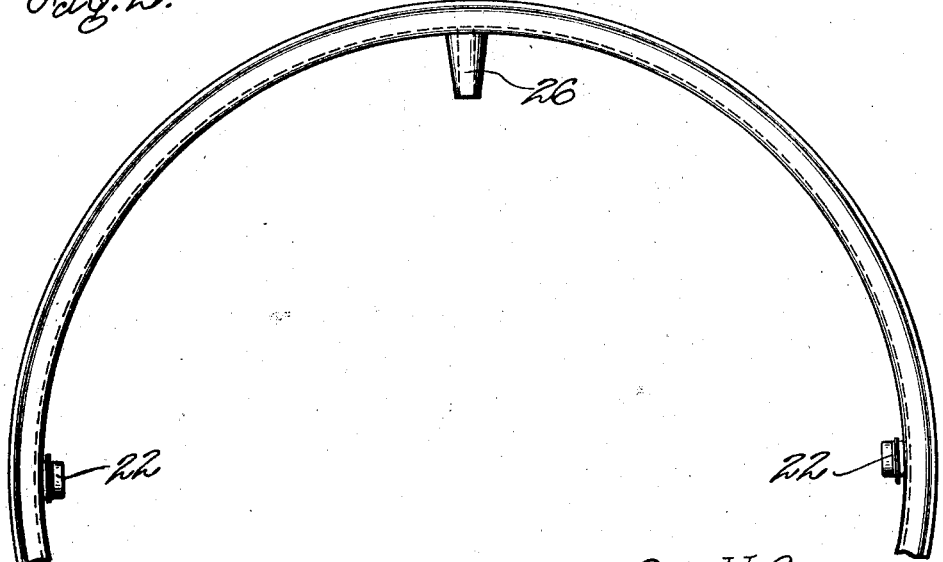
Figure 2 is an enlarged fragmentary edge view of the rim.

Referring in detail to the drawings, wherein like characters of reference denote corresponding parts, the invention is shown as applied to a wheel, the felly of which is indicated at 10. This felly is provided with the usual felly band 11 which is transversely inclined as shown and which is provided at its inner edge with a stop flange 12 for engagement with the rim in the usual manner.

The rim which constitutes the present invention is circumferentially split to provide an inner section 13 and an outer section 14, the adjacent edges of the said sections being beveled outwardly and laterally as shown at 15 with their meeting edges ground, so that when the sections are properly assembled these edges will provide a leak proof joint.

The rim is held in position upon the wheel by any suitable means such as the usual detachable rim lugs 16, the said lugs acting to force the edges of the sections together and any tendency toward outward or radial movement of the inner edge of the outer section will be prevented by the overlapping beveled edge of the inner section. Movement in an opposite direction is prevented by spaced lugs 17 which are carried by the felly band 11 and located between said felly band and rim.

The sections 13 and 14 of the rim are held together prior to placing the rim upon the wheel by means of latches 18, whose inner ends are pivotally connected to the section 13 of the rim as shown at 19 and whose outer ends are transversely reduced and further provided with hooks 20. These hooks are adapted to engage headed studs 21 carried by the outer section 14, the heads 22 of these studs lying within the space provided by the transversely reduced ends of the latches. To prevent accidental disengagement of the hooks and lugs 21, the said hooks are provided with spring retaining members 23 which operate in notches 24 provided in the bills of the hooks and which engage over the lugs 21 as shown in Figure 6 of the drawings. This prevents accidental disengagement of the hooks and lugs due to jolts and vibrations of the vehicle when the rim is mounted upon a tire rack.

In addition to forming a connection between the sections 13 and 14 of the rim, the latches 18 and studs 21 also serve to prevent creeping of the rim or any relative rotary movement of the rim sections. For this purpose, the felly band 11 is provided with transversely arranged grooves or seats 25 whose width is substantially the same as the width of the latches 18 and the heads 22 of the studs and as the latches are carried by the rim section 13 and the headed studs by the rim section 14, both of these sections will have an interlocking engagement with the felly band.

To provide protection for the valve of a pneumatic tire, and to afford additional means to prevent rim creeping, the section 13 of the rim is provided with an inwardly extending tapered sleeve 26 which is adapted to enter an opening 27 extending through the felly and felly band and to snugly fit within the felly opening. The inner end of this sleeve may be secured to the rim by any suitable means, one means being indicated at 28 in Figure 5 of the drawings.

The invention is susceptible of various changes in its form, proportions and minor details of construction and the right is herein reserved to make such changes as properly fall within the scope of the appended claim.

Having described the invention what is claimed is:—

The combination with a demountable rim split circumferentially to provide an inner section and an outer section, of latches having one end pivotally secured to one of the sections, hooks at the outer ends of the latches, headed studs carried by the other section for engagement by the hooks and a spring member secured to the outer end of each of the hooks to partially close the mouths of the latter and yieldingly retain the latches and lugs in engagement.

In testimony whereof I affix my signature.

OTIS HUBBARD GRAY.